(12) United States Patent
Holmström

(10) Patent No.: US 8,100,448 B2
(45) Date of Patent: Jan. 24, 2012

(54) SELF-LOCKING SAFETY HOOK

(75) Inventor: Mikael Lähdesmaki Holmström, Västerås (SE)

(73) Assignee: Gunnebo Industrier AB, Gunnebo (SE)

( * ) Notice: Subject to any disclaimer, the term of this patent is extended or adjusted under 35 U.S.C. 154(b) by 483 days.

(21) Appl. No.: 12/296,077

(22) PCT Filed: Mar. 14, 2007

(86) PCT No.: PCT/SE2007/000246
§ 371 (c)(1),
(2), (4) Date: Nov. 7, 2008

(87) PCT Pub. No.: WO2007/114754
PCT Pub. Date: Oct. 11, 2007

(65) Prior Publication Data
US 2009/0283489 A1  Nov. 19, 2009

(30) Foreign Application Priority Data
Apr. 5, 2006 (SE) .................................. 0600774

(51) Int. Cl.
*B66C 1/36* (2006.01)
(52) U.S. Cl. .................................. 294/82.2; 294/82.19
(58) Field of Classification Search .............. 294/82.17, 294/82.2, 82.18, 82.19, 82.22, 82.24; 24/599.5, 24/599.6
See application file for complete search history.

(56) References Cited

U.S. PATENT DOCUMENTS

| | | | | |
|---|---|---|---|---|
| 1,545,377 A | * | 7/1925 | Westmoreland | 294/82.2 |
| 2,246,630 A | * | 6/1941 | Johnson | 294/19.1 |
| 2,349,021 A | * | 5/1944 | Truesdale et al. | 294/82.19 |
| 3,575,458 A | * | 4/1971 | Crook et al. | 294/82.2 |
| 4,195,872 A | * | 4/1980 | Skaalen et al. | 294/82.19 |
| 5,609,378 A | * | 3/1997 | Bowers et al. | 294/82.19 |
| 5,636,888 A | * | 6/1997 | Kiser et al. | 294/82.19 |

FOREIGN PATENT DOCUMENTS

| | | |
|---|---|---|
| GB | 616729 A | 1/1949 |
| JP | 08277086 A | 10/1996 |
| JP | 2001-253679 A | 9/2001 |
| NO | 20013434 A | 1/2003 |

* cited by examiner

*Primary Examiner* — Paul T Chin
(74) *Attorney, Agent, or Firm* — Duane Morris LLP; J. Rodman Steele, Jr.; Gregory M. Lefkowitz

(57) ABSTRACT

A self-locking lifting hook is disclosed, of the kind having and arcuate hook body and an upper, pivotable lever with one arm forming a suspension and a second arm forming a closure for the hook opening. A finger element is pivotably mounted at the upper part of the hook so as to close the hook opening, under the influence of a spring, irrespective of the pivotal position of the lever, so that the hook opening is always kept closed, unless the closure arm is swung into its fully open position and, thereafter, the finger element is operated so as to be retracted into its opening position.

6 Claims, 6 Drawing Sheets

SELF-LOCKING SAFETY HOOK

FIELD OF THE INVENTION

The present invention relates to a self-locking safety hook of the kind comprising an arcuate hook body defining a hook opening and a two-arm lever being pivotally journalled at an upper end portion of the hook body, one arm of the lever being provided with a suspension element designed to be coupled to a hoisting means, such as a rope, a chain, a wire, or a hoisting strap, and the other arm of the lever being designed as a closure means for the hook opening, the lever being pivotable between a closed position, in which the closure arm abuts the free end of the hook body so as to close the hook opening, and a fully open position, in which the closure arm is swung away from the free end of the hook body so as to enable the insertion of a load into the inside of the hook body, wherein the closure arm is retained in said closed position when the hook is under load, and the hook is designed to carry the whole load during a lifting operation.

BACKGROUND OF THE INVENTION

Lifting hooks with various safety arrangements are well-known in the art, the two predominant ones, being illustrated in the appended drawings, FIGS. 1 and 2.

FIG. 1 shows a conventional lifting hook with an arcuate hook body 101 which at its upper part is provided with a suspension means in the form a transversal, detachable pin 102 to be coupled to the end link of a hoisting chain (not shown) and a pivotable closure arm 103. The latter is spring-loaded to a closing position (as shown), where it closes the hook opening 104 and holds a lifting gear represented here by a link 105 (coupled to a load, not shown) securely in place. The arm 103 can be swung against the spring means into an inward position where it keeps the hook opening 104 free and enables insertion of a link 105 or similar into the inside of the hook. As is well-known in the art, the pin 102 can be replaced by a closed eye or a swivel member which is attachable to a hoisting chain, a rope, a wire or a hoisting strap. According to some proposals, see e.g. the Norwegian laid-open print 20013434 (Ekeskog et al) and the Japanese published patent application JP2001253679), a further closure arm is disposed in the hook opening, one being pivotable inwardly and the other being pivotable outwardly in relation to the tip of the hook body. However, such an arrangement is not very practical, since the operator has to manipulate both closure arms manually, which is difficult and somewhat risky.

FIG. 2 illustrates a self-locking lifting hook of the kind defined in the opening paragraph, including an arcuate hook body 111 with a fork-like upper portion 112, where a two-arm lever 113 is pivotally journalled on a transverse pin 114 extending between the two shanks of the upper portion 112.

The lever 113 comprises an upper arm 115, provided with a suspension pin 116 (or some other suspension member), and a lower closure arm 117, which in a loaded situation keeps the hook opening 120 closed so as to retain a link 118 securely in the hook. Often, there is a spring loaded locking mechanism in the upper part 112 of the hook body, which can hold the closure arm either in the closed position (as shown) or in a fully open position.

In case of the conventional lifting hook according to FIG. 1, the lifting gear represented by the link 105 can in a non-loaded situation unintentionally swing to a position above the hook tip, see FIG. 1, where it when loaded or by its own weight can force the closure arm 103 to open, resulting in dropped lifting gear/load.

The traditional self locking hook according to FIG. 2 withstands the above described risk due to its design having a strong closure arm 117 pivotable outwardly. The self locking hook type remains due to its design always in a closed position as long as it is loaded. The locking mechanism is intended to secure the closure arm 117 in a closed position also in non-loaded situations. However the locking mechanism can unintentionally become released due to a direct hit on the locking mechanism or by momentum of inertia if the hook collides with a hard structure. Alternatively, it may happen that a possible locking mechanism (in the embodiment of FIG. 2) becomes inoperable e.g. due to wear, breakage of a spring or for some other reason, resulting in risk of dropping lifting gear/load.

SUMMARY OF THE INVENTION

Against this background, it is a main object of the invention to provide a self-locking hook with an additional safety feature so as to reduce the risk of unintentional dropping the load from the hook, especially in connection with insertion of the load into the inside of the hook body.

A further object is to provide a self-locking lifting hook which is easy to handle and operate.

The main object is achieved for a self-locking lifting hook of the kind identified above, wherein a finger element is pivotably mounted at the upper part of the hook so as to close the hook opening, under the influence of a spring means, irrespective of the pivotal position of the two-armed lever.

In this way, the safety level is significantly increased, since the finger element will keep the hook opening closed at all times, even when the two-arm lever is opened permanently or temporarily, in particular when handling the hook and the associated lifting gear before a lifting operation.

The finger element, which can be dimensioned as a relatively light and not very strong component, is preferably pivotably mounted adjacent to the pivot axis of the two-arm lever, either on the hook body itself, or on the closure arm of the lever.

Various detailed embodiments of the self-locking lifting hook according to the invention are defined in the claims and will appear from the detailed description below.

The inventive lifting hook will now be described in more detail below, with reference to the accompanying drawings.

DETAILED DESCRIPTION OF PREFERRED EMBODIMENTS

Figure 1:
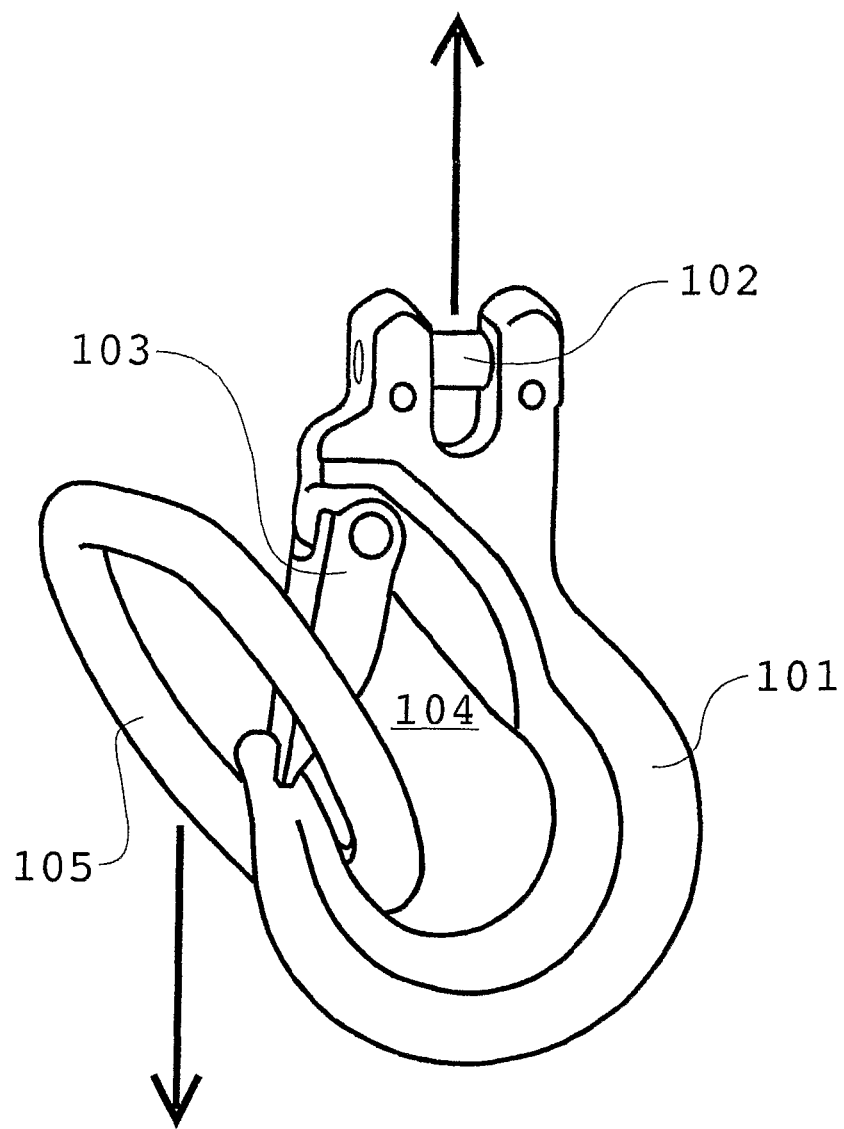
FIGS. 1 and 2 illustrate schematically two prior art lifting hooks.
Figure 2:
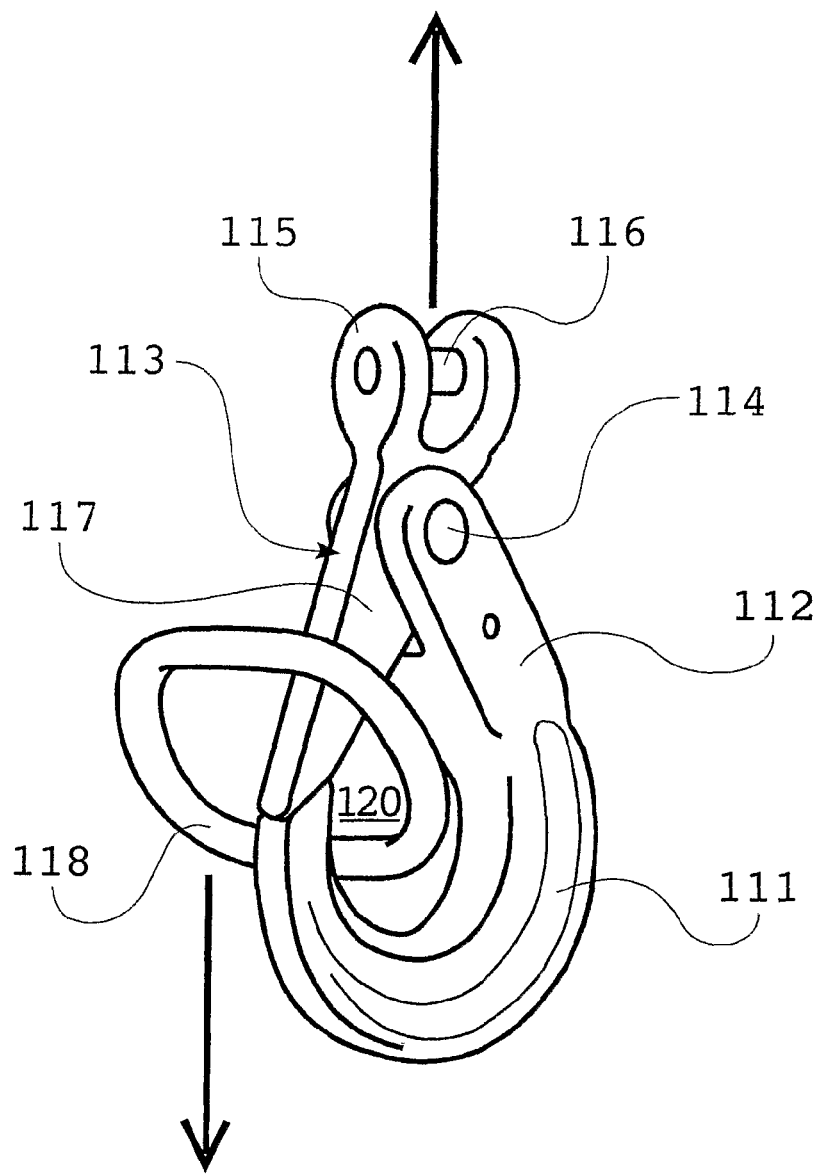

In order to eliminate the drawbacks of prior art hooks, as shown in FIGS. 1 and 2 and as discussed above, the self-locking hook according to the invention is provided with an extra safety measure in the form of a finger element, as illustrated in the drawing FIGS. 3a-3d, 4a-4d, 5a-5d, and 6a-6d.

Figure 3A:
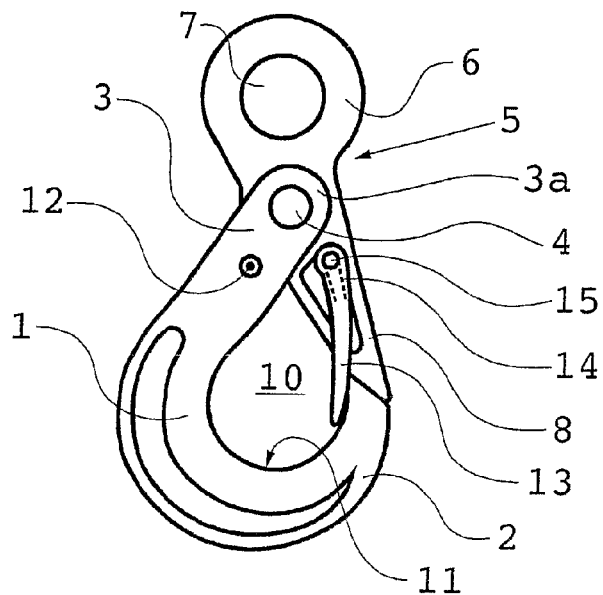
FIGS. 3a, 3b, 3c show a self-locking lifting hook according to the invention, in a closed position (FIG. 3a), in an open position (FIG. 3b) where the finger element is obstructing the hook opening, and in a fully open position (FIG. 3c) where the finger element is retracted so as to keep the hook opening free.
Figure 3B:
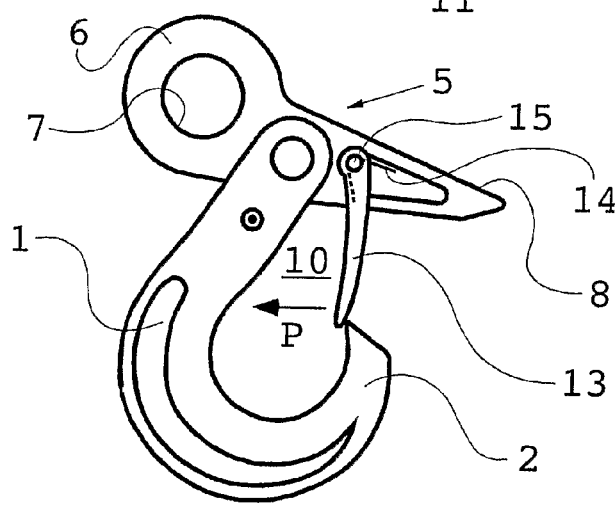
Figure 3C:
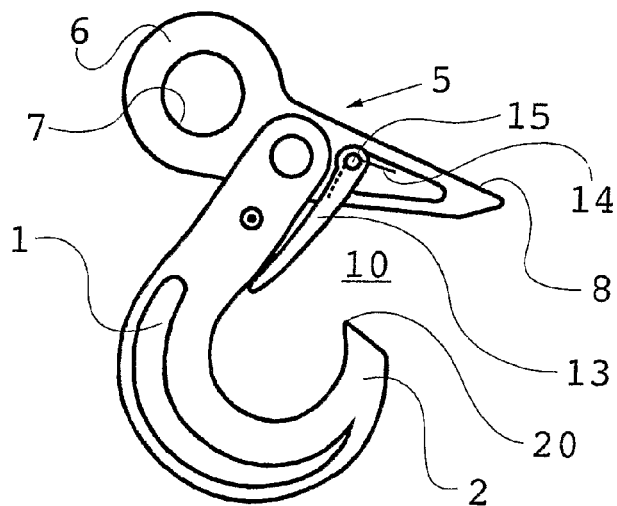
Figure 4A:
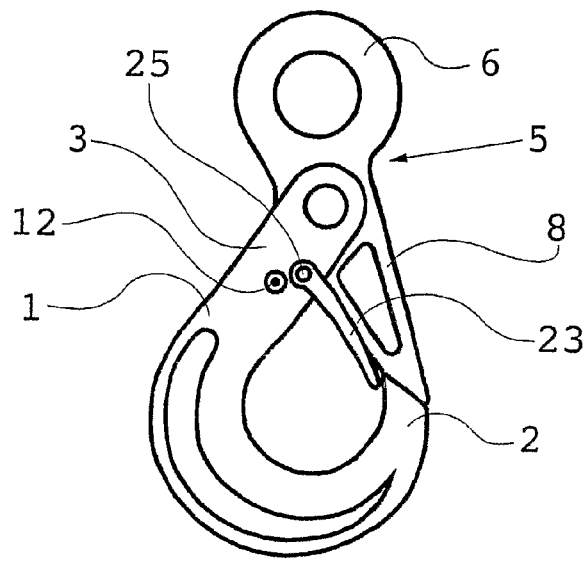
FIGS. 4a, 4b, 4c show a second embodiment of the self-locking lifting hook in corresponding positions as in FIGS. 3a-3c.
Figure 4B:
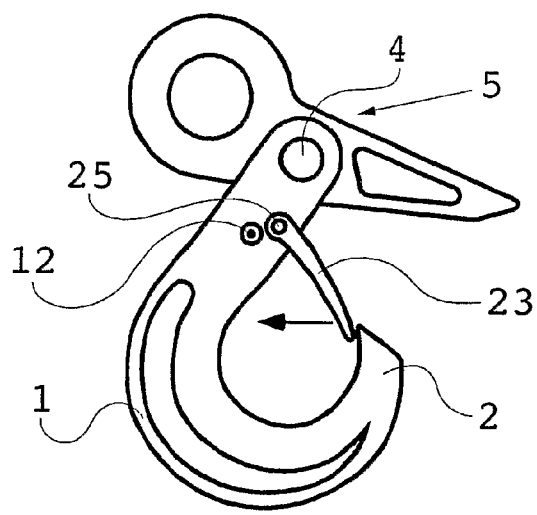
Figure 4C:
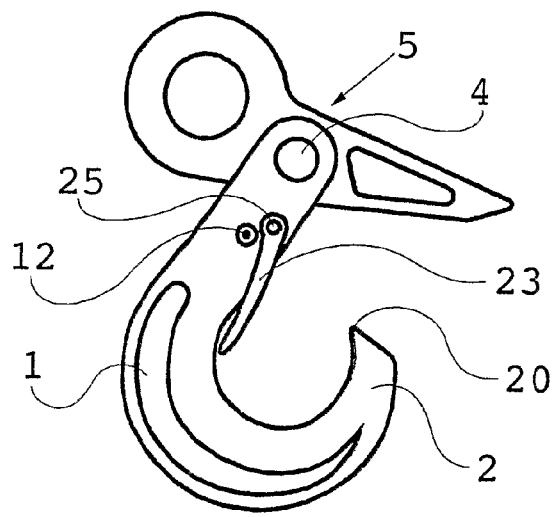

In the first embodiment shown in FIGS. 3a, 3b and 3c, the self-locking hook comprises an arcuate hook body 1, having a free end or tip 2 and an upper fork-like end portion 3 with two parallel shanks (only one, 3a, is visible in the drawing). A pivot pin 4 extends between the two shanks and is fitted through a corresponding transverse bore of a two-arm lever 5 having an upper arm 6, provided with a suspension means in the form of a closed eye 7 (for coupling e.g. with a shackle to a lifting chain—not shown) and a closure arm 8. This closure arm 8 extends all the way down to the tip 2 of the hook body 1 and closes the hook opening 10 effectively in the position shown in FIG. 3a. Here, the end portion 9 of the closure arm abuts the tip 2 of the hook body 1.

The lifting hook is self-locking by way of its structure with the lifting eye 7 and the central supporting point 11 inside the hook body being located on an imaginary lifting axis which is slightly displaced sideways in relation to the central axis of the pivot pin 4, resulting in a closure force acting on the closure arm during a lifting operation.

Furthermore, there is a locking mechanism (not visible in the drawings) inside the fork-like upper portion 3 of the hook body, disposed on a transversal pin 12 and cooperating with a cam surface on the closure arm, adjacent to the pivot pin 4. In this way, the lever 5 can be locked in the closed position of FIG. 3a or in the open position shown in FIGS. 3b and 3c.

However, when the hook is being handled in preparation of a lifting operation, the lever 5 with its closure arm 8 must be opened so as to enable insertion of an element, such as master link coupled to a number of chain legs, one or more hoisting straps, or the like, into the opening 10 of the hook. Of course, when the closure arm 8 is located in its open position, there is a risk that the load element falls out of the opening 10. This risk is also present when the closure arm 8 is located in its closed position, as shown in FIG. 1, in case the latch with the locking mechanism is actuated unintentionally or the locking mechanism fails or becomes inoperative for some reason.

In order to reduce this risk, the present invention provides for an extra safety measure constituted by a finger element 13, which is mounted at the upper part of the hook 1,5 and which is spring-loaded so as to take a position closing the hook opening 10 with its lower end portion extending towards the tip 2 of the hook body 1, irrespective of the particular position of the two-arm lever 5. This is clearly illustrated in FIGS. 3a and 3b.

The spring 14, exerting a force urging the finger element into abutment with the tip 2 of the hook 1, can be formed by a steel wire bent around the pivot pin 15 (where the finger is pivotably mounted) and secured with its ends to the closure arm 8 and the finger element 13, respectively.

When the load, e.g. a master link or a hoisting strap, is inserted into the hook opening 10, the finger element 13 is resiliently retracted inwards towards the inside of the hook body, as illustrated by the arrow P in FIG. 3b and, in its final position, in FIG. 3c, either manually by the operator handling the lifting gear, or by merely forcing a link or some other component into the opening so as contact the finger element and thereby push it inwardly by way of such a contact.

In the embodiment of FIGS. 3a, 3b, 3c, the pivot pin 15 is mounted on the lever 5, adjacent to the pivot 4 on which the lever is journalled. As an alternative, in the modified embodiment illustrated in FIGS. 4a, 4b and 4c, the finger element 23 is mounted on the hook body 1, at the upper end portion 3 thereof, not far from the pivot pin 4 carrying the lever 5. The mounting or pivot pin 25 is thus located in the vicinity of the pivot pin 12 carrying the (non-illustrated) latch inside the fork-like upper end portion of the hook body 1. In this case, the spring 14, urging the finger element towards the tip 2, is disposed inside the fork-like end portion 3 of the hook body 1, and is consequently not visible in FIGS. 4a-4c.

The rest of the hook, including the hook body, and the lever 5, is basically the same as in the previous embodiment.

Figure 5A:
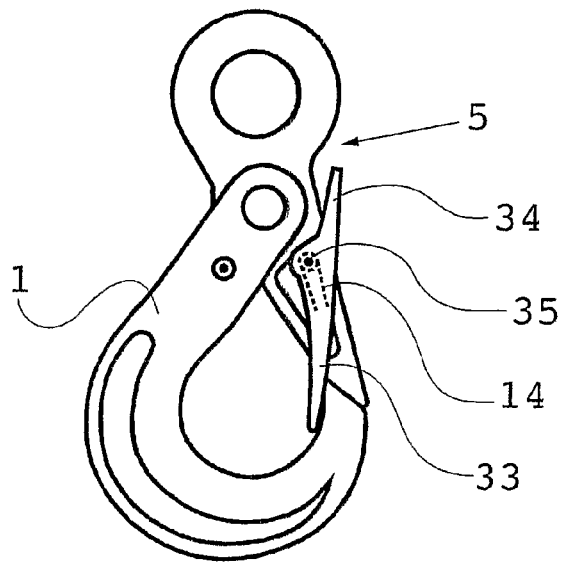
FIGS. 5a, 5b, 5c show a third embodiment of the self-locking lifting hook, likewise in corresponding positions as in FIGS. 3a-3c.
Figure 5B:
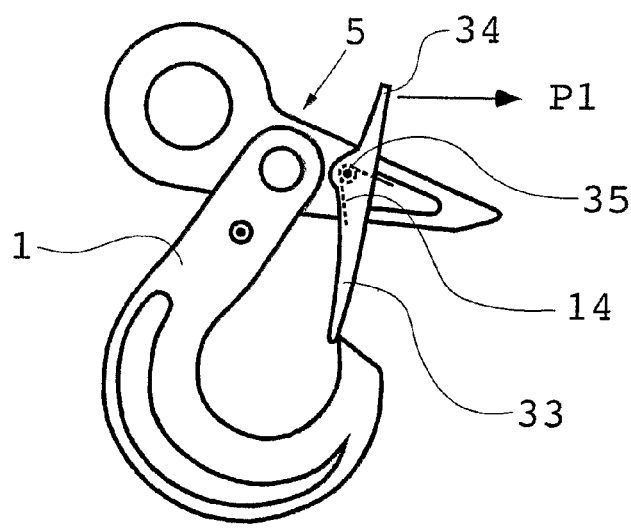
Figure 5C:
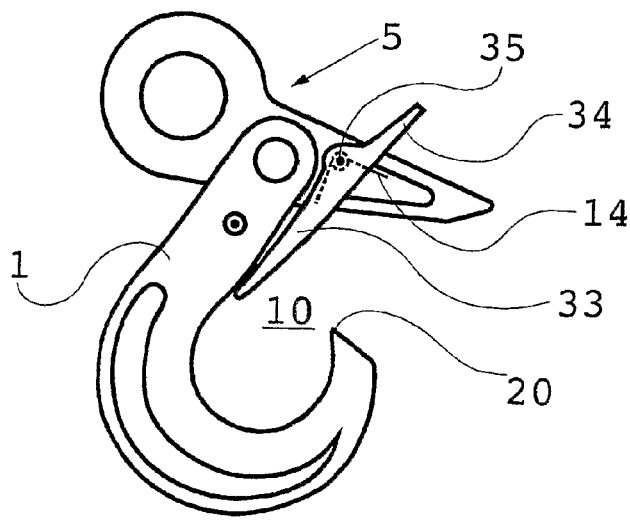

In FIGS. 5a, 5b, 5c, there is shown a further embodiment, including a finger element 33 which is mounted on the closure arm of the lever 5, approximately at the same location of the pivot point 35 as in first embodiment. Here, the finger element 33 is extended also upwardly, so as to form a freely projecting end portion 34. This end portion 34 serves as a gripping element for the operator, so that he/she can manipulate the finger element by manually pushing the end portion 34 in the direction of the arrow P1 (FIG. 5b), so that the inner part of the finger element swings inwardly towards the hook body 1 and makes the hook opening 10 freely accessible (FIG. 5c). In doing so, the operator does not need to come anywhere near the interior of the hook. Hereby, the operator can manipulate the finger element from the outside of the hook, and the risk of hurting the operator's hand or fingers is thereby substantially reduced.

Figure 6A:
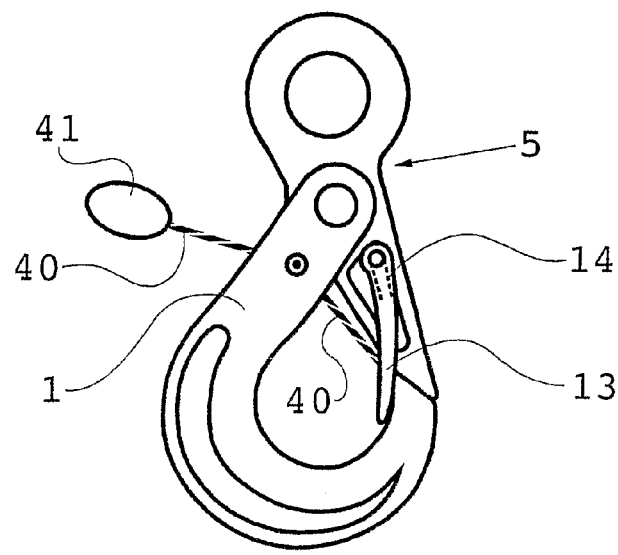
FIGS. 6a, 6b, 6c show a forth embodiment of the self-locking lifting hook, also in corresponding positions as in FIGS. 3a-3c.
Figure 6B:
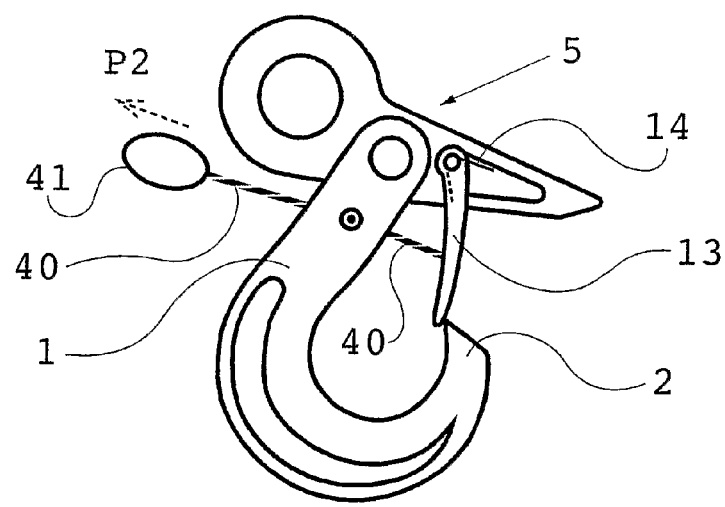
Figure 6C:
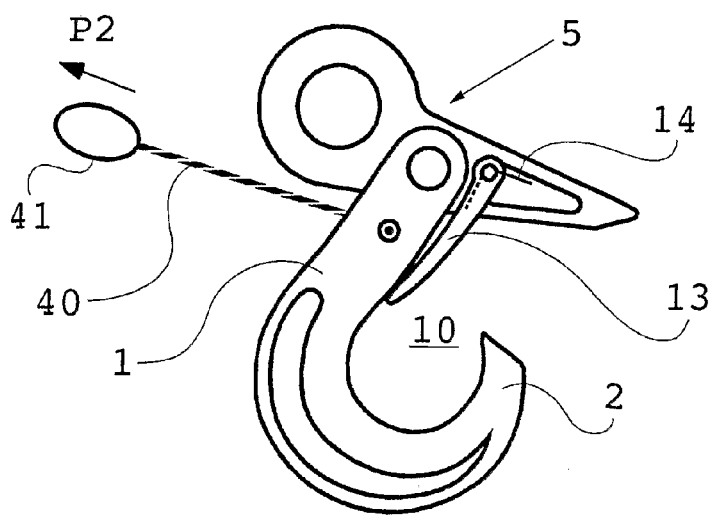

Another embodiment, which enables easy and low-risk handling of the hook, is shown in FIGS. 6a, 6b, 6c. The structure of the hook body 1, the lever 5 and the finger element 13 is the same as in FIGS. 3a-3d. Additionally, there is a flexible pulling member, such as a string 40 with a handle or ring member 41 at the free end thereof. In this case, the operator can easily grip the handle or ring member 41 and pull the string 40 in the direction of the arrows P2 (FIGS. 6b and 6c), against the action of the spring member 14 so as to swing the finger element 13 into its position leaving the hook opening 10 free (FIG. 6c).

As will be understood by those skilled in the art, the lever 5 with its closure arm 8 forms an integral part of the self-locking hook and must be dimensioned so as to carry the load to be lifted. On the other hand, the finger element 13, 23 and 33, respectively, is not subjected to any strong forces and can therefore be relatively light-weight and slender. Thus, it is advantageous if it is relatively narrow, so as to occupy as little space as possible in its operative position (as shown in FIGS. 3c, 4c, 5c and 6c) where it should leave the hook opening 10 freely accessible. Preferably, the closure arm 8 is at least twice as wide as the finger element 13,23,33, as measured adjacent to the pivot axis 4 of the lever 5.

The finger element 13 etc. should preferably be pivotably mounted rather close to the pivot axis 4 of the lever 5, so that it can obstruct the opening 10 effectively in its normal rest position, and still be able to clear the opening 10 and be out of the way when it is swung inwards towards the hook body. The length of the finger element should therefore be approximately the same as the length of the closure arm 8 of the lever 5.

In the preferred embodiments as shown on the drawings, the free end portion of the hook body 1 has a pointed end 20, such that the free end portions of the closure arm 8 and the finger element 13 (and 23,33) can abut the adjacent surface portions on the inside and the outside of the pointed end 20, respectively.

The invention claimed is:

1. A self-locking lifting hook for lifting a load, of the kind comprising:
an arcuate hook body having an upper end portion provided with a pivot pin on which a two-arm lever is journalled, a lower arcuate portion provided with a central supporting point at the inside for carrying the entire load during a lifting operation, and a free end portion with a pointed end, said upper end portion and said pointed end defining a hook opening there between, said hook opening facing upwards during use of the hook, including loading and unloading the hook, the pointed end being situated at a higher level than the central supporting point, said two-arm lever having an upper arm provided with a suspension element designed to be coupled to a hoisting means, such as a rope, a chain or a wire, and a lower arm extending from said pivot pin to a free end portion and being designed as a closure means for said hook opening, said lever being pivotable at said pivot pin between a closed position, in which said free end portion of the closure arm abuts the outside of said pointed end of the hook body, and a fully open position, in which the closure arm is swung away from said pointed end of the hook body so as to provide access to said hook opening and enable the insertion of a load into the inside of the hook body onto said central supporting point, wherein the closure arm is retained in said closed position when the lifting book is under load by way of said upper suspension element and said central supporting point inside the hook body being located on an imaginary lifting axis which is displaced sideways in relation to the pivot pin, wherein the lifting hook further comprises a finger element adapted to keep said hook opening closed upon said lever being pivoted to its fully open, position when being unloaded, and wherein the closure arm is provided with a second pivot pin adjacent to the pivot pin, on which second pivot pin the finger element is pivotably mounted on the closure arm, so as to close said hook opening, under the influence of spring means, irrespective of the pivotal position of said lever, so that the hook opening is always kept closed, unless the closure arm is swung into its fully open position and, thereafter, the finger element is operated so as to be retracted into its opening position.

2. The self-locking hook defined in claim 1, wherein said finger element extends with its free end into the interior of said hook body and is pivotable between an opening position, which its free end is located adjacent to the inside of the upper part of said hook body, and a closing position, in which its free end abuts the free end portion of said hook body.

3. The self-locking hook defined in claim 1, wherein said finger element has an upper portion extending beyond said second pivot pin so as to form a grip portion for manual opening of said finger element against the action of said spring means.

4. The self-locking hook defined in claim 1, wherein the finger element is operable by means of a flexible pulling member, whereby the finger element can be opened against the action of said spring means.

5. The self-locking hook defined in claim 1, wherein said closure arm or said lever is substantially wider and stronger than said finger element.

6. The self-locking hook defined in claim 5, wherein said closure arm is at least twice as wide as said finger element, as measured adjacent to said pivot axis of said lever.

* * * * *